(12) United States Patent
van Riel et al.

(10) Patent No.: US 10,102,116 B2
(45) Date of Patent: Oct. 16, 2018

(54) MULTI-LEVEL PAGE DATA STRUCTURE

(71) Applicant: Red Hat Israel, Ltd., Raanana (IL)

(72) Inventors: Henri van Riel, Raanana (IL); Michael Tsirkin, Raanana (IL)

(73) Assignee: RED HAT ISRAEL, LTD., Raanana (IL)

( * ) Notice: Subject to any disclaimer, the term of this patent is extended or adjusted under 35 U.S.C. 154(b) by 475 days.

(21) Appl. No.: 14/851,166

(22) Filed: Sep. 11, 2015

(65) Prior Publication Data

US 2017/0075814 A1 Mar. 16, 2017

(51) Int. Cl.
*G06F 12/02* (2006.01)

(52) U.S. Cl.
CPC .................. *G06F 12/023* (2013.01)

(58) Field of Classification Search
CPC .................................................. G06F 12/023
See application file for complete search history.

(56) References Cited

U.S. PATENT DOCUMENTS

| | | | |
|---|---|---|---|
| 6,085,296 A | 7/2000 | Karkhanis et al. | |
| 7,337,296 B2 | 2/2008 | Noel et al. | |
| 7,562,204 B1 | 7/2009 | Cholleti et al. | |
| 8,352,705 B2 | 1/2013 | Agesen | |
| 8,738,860 B1 | 5/2014 | Griffin et al. | |
| 2009/0193184 A1 | 7/2009 | Yu et al. | |
| 2010/0318845 A1* | 12/2010 | Kohiga | G06F 11/073 714/15 |
| 2010/0332720 A1* | 12/2010 | Chang | G06F 9/45537 711/6 |
| 2011/0022818 A1 | 1/2011 | Kegel et al. | |
| 2012/0246381 A1 | 9/2012 | Kegel et al. | |

OTHER PUBLICATIONS

"Chapter 3 Page Table Management" https://www.kernel.org/doc/gorman/html/understand/understand006.html, accessed Jun. 25, 2015, 17 pages, Nov. 2007.
Simon Gog et al. "Optimized Succinct Data Structures for Massive Data" http://people.eng.unimelb.edu.au/sgog/optimized.pdf, Department of Computing and Information Systems, The University of Melbourne, VIC, 3010, Melbourne, Australia; School of Computer Science and Information Technology, RMIT University, VIC, 3001, Melbourne, Australia, May 13, 2010, 28 pages.

* cited by examiner

*Primary Examiner* — Larry T Mackall
(74) *Attorney, Agent, or Firm* — Haynes and Boone, LLP

(57) ABSTRACT

Methods, systems, and computer program products for receiving a memory allocation request; comparing a memory size corresponding to the memory allocation request to a memory size threshold; allocating a memory page that has a size larger than the memory size threshold, the memory page having a page entry in a page management data structure; and allocating a portion of the memory page, the portion of the memory page corresponding to a sub-page of the memory page.

19 Claims, 7 Drawing Sheets

| Page Frame Number 502 | Page Offset 504 |
FIG. 5A
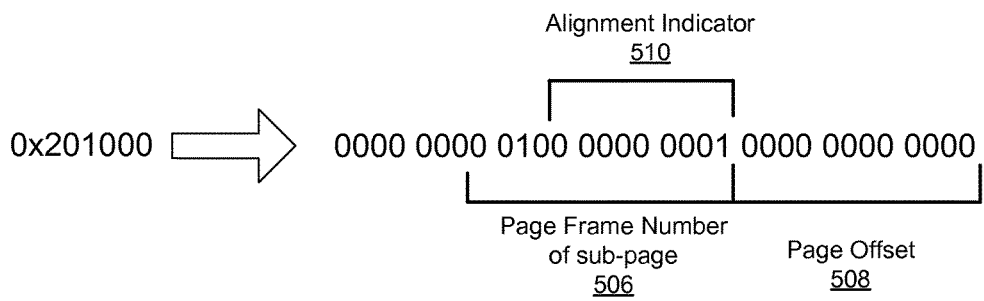
FIG. 5B
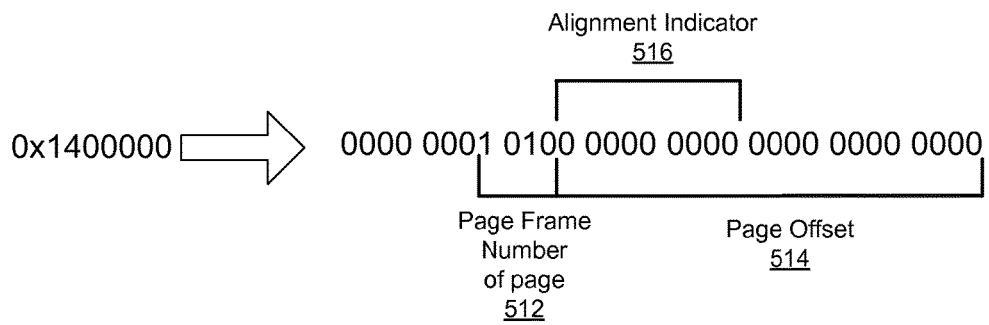
FIG. 5C

MULTI-LEVEL PAGE DATA STRUCTURE

BACKGROUND

The present disclosure relates generally to memory management, and more particularly to memory pages.

Conventional computer systems include a large amount of memory. For example, a main memory of a computer system may include non-volatile memory that is in excess of a terabyte. This memory is used for manipulating data. For example, a computer system may execute program from this memory and store program data in this memory.

The amount of memory accessible to a computer system has increased over time while the cost per byte of memory has decreased. These advancements in memory technology and lower costs have resulted in computer systems having vast amounts of memory. To handle the large amount of memory, computer systems include a kernel, which is a central part of an operating system. The kernel manages system resources of the computer system, such as the memory. The kernel divides the memory of the computer system into units that are referred to as memory pages or "pages." Each page is associated with a subset of the memory of the computer system. Typically, the kernel manages the memory pages using page management data structures. The page management data structures store page entries corresponding to the pages. Each page in memory has an associated page entry in the page management data structure that defines the page.

As the amount of memory in a computer system has increased, the number of pages utilized by the kernel has also increased. Further, because each page is associated with a page entry, the size of the page entry data structures has also increased.

BRIEF SUMMARY

According to an example, a method includes receiving a memory allocation request. The method further includes comparing a memory size corresponding to the memory allocation request to a memory size threshold. The method further includes allocating a memory page that has a size larger than the memory size threshold, the memory page having a page entry in a page management data structure. The method further includes allocating a portion of the memory page, the portion of the memory page corresponding to a sub-page of the memory page. The method further includes setting a parameter in the page entry, the parameter indicating that the memory page includes one or more sub-pages.

According to an example, a computer program product stored on a non-transitory computer-readable medium includes machine readable instructions that when executed by a processor cause the processor to determine that a memory size corresponding to the memory allocation request is below a memory size threshold. The processor further to allocate a memory page, the memory page having a page entry in a page array. The processor further to allocate a sub-page of the memory page, the sub-page included within a range of physical memory allocated to the memory page. The processor further to set a parameter in the page entry to indicate that the memory page includes one or more sub-pages.

According to an example, a system for managing memory pages includes a processor and a memory, the memory including a sub-page that is stored within a memory page. The system further includes a page array in the memory that includes a page entry corresponding to a memory page. The system further includes a parameter in the page entry that indicates that the memory page is split into one or more sub-pages. The processor further to create a sub-page entry in a sub-page of the one or more sub-pages, the sub-page entry including at least the following parameters: an address space corresponding to the sub-page; an index into the address space; and one or more flags corresponding to the sub-page.

BRIEF DESCRIPTION OF THE DRAWINGS

FIG. 5A is an organizational diagram illustrating a layout of a virtual memory address, in accordance with various examples of the present disclosure.

FIG. 5B is an organizational diagram illustrating a layout of a virtual memory address of a sub-page, in accordance with various examples of the present disclosure.

FIG. 5C is an organizational diagram illustrating a layout of a virtual memory address of a page, in accordance with various examples of the present disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
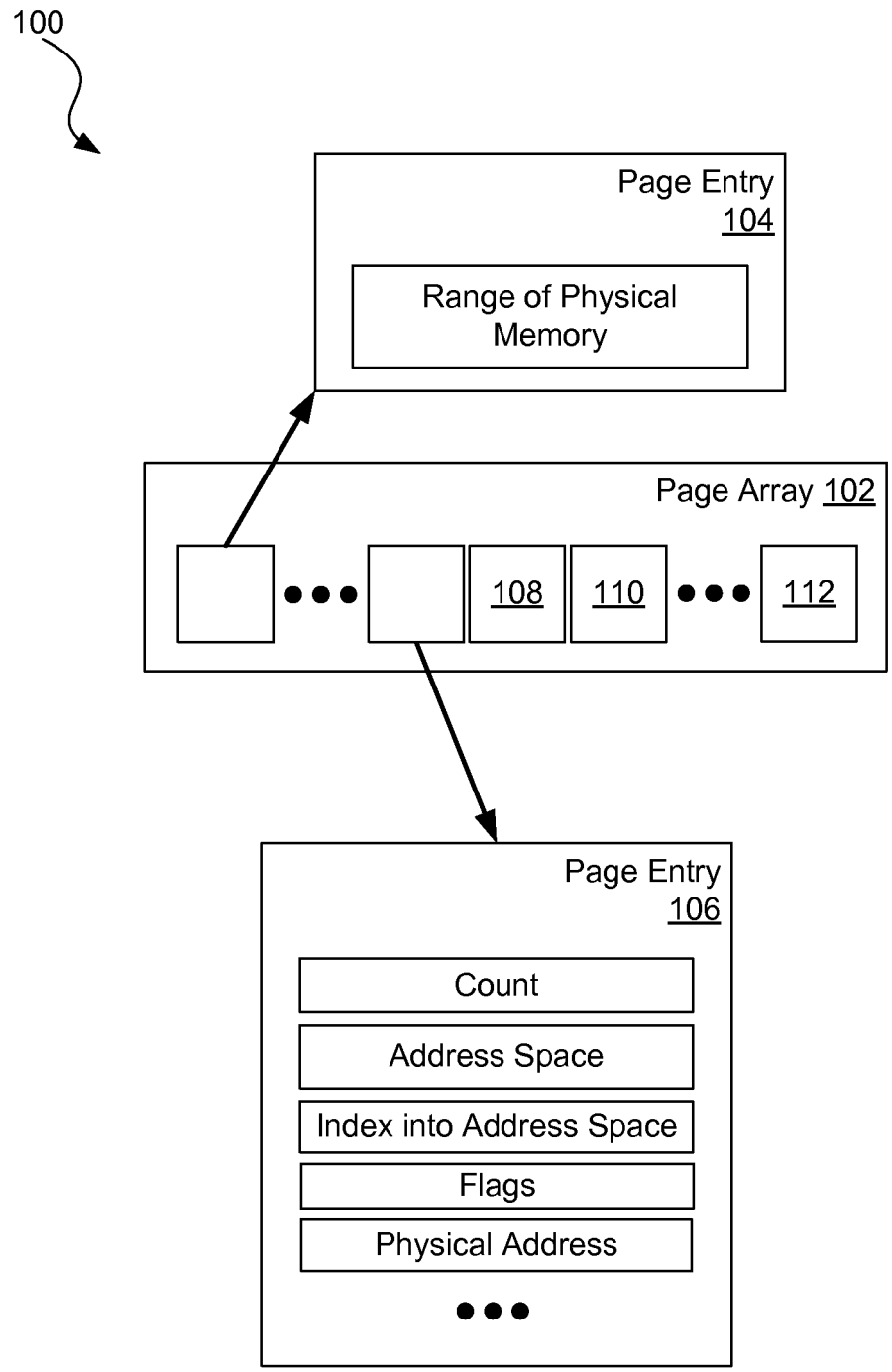
FIG. 1 is an organizational diagram illustrating a data structure for managing memory pages, in accordance with various examples of the present disclosure.

A data structure 100 for managing memory pages, in which various aspects of the present disclosure may be implemented, is described with reference to FIG. 1.

In the present example, the data structure 100 includes a page array 102. The page array 102 includes a plurality of page entries 104, 106, 108, 110 and 112. In the present example, the page array 102 is an array data type. In other examples, the page array 102 may be another data structure type, such as a linked list, table, tree, and so forth. The page array or other data structure that includes the page entries may be referred to as a page management data structure.

The page array 102 stores page entries 104-112 and/or includes pointers to page entries 104-112. The page array 102 may be indexed, such as by virtual memory addresses. For example, virtual memory addresses may be mapped to the page entries 104-112 in the page array 102 by an index or lookup function. The page array 102 is configured to map the virtual memory addresses corresponding to the page entries 104-112 to page frame numbers, which may also be referred to as physical addresses.

The present example illustrates a single page array; however, in other examples, a plurality of page arrays may be used. For example, a first page array may store page entries corresponding to memory pages having a first size. The memory pages having a first size may be, for example, 2 MB (two megabytes). A second page array may store page entries corresponding to memory pages having a second size that is different than the first size. The memory pages having a second size may be, for example, 4 KB (four kilobytes). The memory pages having the first size may be referred to as large pages and the memory pages having the second size may be referred to as small pages. In other examples, the large memory pages are 2 GB (two gigabytes) and the small pages are 2 MB. In other examples, there may be more than two pages sizes. For example, a first page size may be 2 GB, a second page size may be 2 MB and a third page size may be 4 KB. In yet other examples, the pages may have other sizes not specifically discussed.

Memory pages corresponding to the page entries 104-112 may be split into sub-pages. For example, a large page that is 2 MB in size may be split into 512 small pages that are each 4 KB in size. In some examples, the large page is referred to as a page, and the small pages are referred to as sub-pages or split-pages. In some examples, sub-pages may be further split into sub-sub-pages.

In the present example, each page entry has a data type that groups parameters corresponding to that page entry. In some examples, a "struct" or structure data type is used to define each page entry. In other examples, a class data type is used to define each page entry. Each page entry has a size. For example, a page entry may have a size of 64 bytes. The size of the page entry may be configured based on the amount of data to be stored in the page entry. Other sizes of page entries may be used depending upon the amount of data that is stored in the page entries.

Each page entry corresponds to a memory page or a sub-page of a memory page. For example, the page entry 106 includes parameters that define a memory page or sub-page. The memory page or sub-page may be accessed by performing a lookup on the page entry 106 using a virtual address. By accessing the page entry 106, the computer system may determine the features of the page or sub-page, based on the parameters included in the page entry 106. In addition, the page entry 106 may also be used to determine a page frame number, which may identify a physical address of the memory page in the memory. Determining a page frame number using a page entry is discussed in further detail with respect to FIG. 4.

In the present example, a page entry 104 includes a range of physical memory parameter that specifies a range of physical memory where the memory pages and sub-pages corresponding to the page entries are located. The range of physical memory may be contiguous or non-contiguous. For example, the range of physical memory may specify one or more ranges of physical memory that each have a start address and an end address.

The page array entry 104 may also be referred to as an index page entry because it specifies information corresponding to the page entries in the page array. An index page entry may be positioned as a first page entry, as is illustrated in the present example. In some examples, an index page entry may be positioned as a last page entry in the page array. In other examples, a page array does not include an index page entry.

In the present example, the page entry 106 includes parameters such as a count, index into address space, address space, flags, physical address, and so forth. In other examples, the physical address parameter is not included in the page entry 106. In some examples, additional, fewer and/or different parameters may be specified in a page entry.

In the present example, the page entry 106 includes a count parameter that identifies a number of processes and/or virtual systems to which the memory page is allocated. The count parameter may be used, for example, to support memory deduplication. Memory deduplication refers to sharing a memory page between a plurality processes and/or virtual systems. For example, a virtual system may attempt to allocate a memory page that is identical to an already existing memory page. Rather than creating a new memory page, the existing memory page may be used, and the count corresponding to the memory page may be incremented. If the count indicates that the memory page is a deduplicated memory page, a copy-on-write technique may be performed if the memory page is modified by a process and/or virtual system.

In the present example, the page entry 106 includes an address space parameter that identifies the address space corresponding to the memory page. For example, if the memory page corresponds to a file, the address space parameter may identify the address space corresponding to the file. The page entry 106 may also include an index into the address space parameter that identifies the offset into the address space where the memory page corresponding to the page entry is located. For example, if the memory page is a first memory page of a file, the index into address space parameter may be set to 0, indicating that the memory page is at the beginning of the file. Similarly, if a memory page is a second memory page of the file, the index into address space parameter may be set to 1. The index into the address space may be further incremented for each additional memory page of the file. For example, a file may be 12 KB (twelve kilobytes) in size, and composed of three memory pages that each have a size of 4 KB (four kilobytes). The address space specified in the page entry 106 may identify the address space corresponding to the 12 KB file, with the first memory page at offset 0 of the file being assigned an index into the address space of 0. The second memory page at offset 4 KB of the file is assigned an index into the address space of 1. The third memory page at offset 8 KB into the file is assigned an index into the address space of 2.

In the present example, the page entry 106 includes one or more flags. Flags may include, for example, a pg_split flag that identifies whether the memory page is split into a plurality of sub-pages. For example, a memory page may be a large memory page that is 2 MB in size. The memory page may be split into a plurality of 4 KB sub-pages. In this example, a flag may be set in the page entry corresponding to the memory page that indicates that the memory page has been split and includes the sub-pages. A flag may also be set in each sub-page to indicate that the sub-page is split from a page.

Flags may also include, for example, a valid flag that indicates that the memory page or sub-page is valid and ready for use.

In the present example, the page entry 106 includes a physical address parameter. The physical address parameter may specify a page frame number that identifies the physical location of the memory page corresponding to the page entry. In some examples, the page entries are configured with the physical address in order to identify the page frame numbers of the memory pages and sub-pages. Storing the physical address in the page entries may increase the size of the page entries, which may cause a large increase in the size of the page arrays that store the page entries.

In some examples, to conserve memory, page entries do not store the physical address. In these examples, a calculation may be performed to identify the page frame number of a page or sub-page associated with the page entry. Accordingly, rather than retrieving a physical address from a page entry, the physical address is calculated. Calculating the physical address rather than retrieving the physical address from the page entry may result in a longer access time for determining the physical address of the page.

Accordingly, the physical address may be stored in the page entry to increase the speed of the page access, and the physical address may not be stored in the page entry in order to conserve memory. One or both techniques may be used, based on a balancing of the cost considerations (access time versus memory usage). In some examples, some page arrays may use page entries having a physical address parameter, while other page arrays in the same computer system may calculate the physical address rather than storing the physical addresses in the page entries. For example, for large pages, the physical address may be stored in the page entries, while for small pages the physical address may be calculated. In another example, the physical address may be stored in page entries for small pages, but not for large pages.

Figure 2:
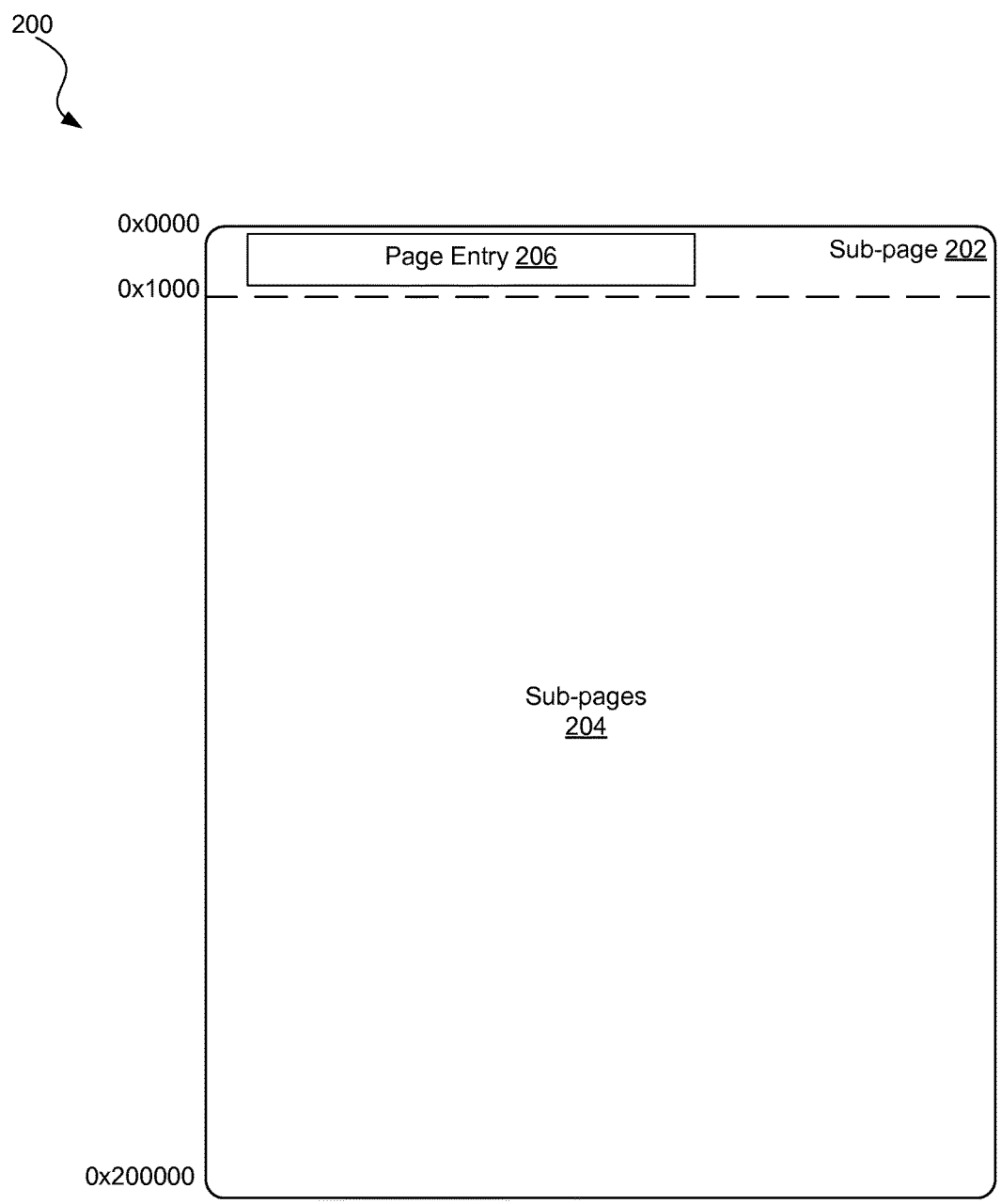
FIG. 2 is an organizational diagram illustrating a memory page that is split into a plurality of sub-pages, in accordance with various examples of the present disclosure.

A memory page 200 including a plurality of sub-pages, in which various aspects of the present disclosure may be implemented, is described with reference to FIG. 2.

The memory page 200 may be referred to as a page or a large page.

In the present example, the memory page 202 has a length of 0x200000 (2,097,152 bytes), which is referred to as a 2 MB memory page. In other examples, memory pages may be of other lengths. For example, a memory page may be 2 GB. Offset 0x0000 identifies the beginning of the memory page 200, and offset 0x200000 identifies the end of the memory page 200. In the present example, the memory page 200 is allocated in a main memory and may be filled with code and/or data.

In the present example, the memory page 200 includes sub-pages 202 and 204. A sub-page is a portion/subset of the page that is smaller than the memory page. The sub-page may also be referred to as a small page or a split-page. In the present example, each sub-page is 4 KB (4096 bytes) in size, such that the first sub-page 202 is positioned between offsets 0x0000 and 0x1000 of the memory page. In the present example, sub-pages 204 include one or more sub-pages that are allocated in the memory page 200. The offsets of the sub-pages 202 and 204 include data and/or code that is stored in memory. An offset is a memory address within a page or sub-page that may be used to store code and/or data. In the present example, the memory page 200 includes offsets 0x0000 to 0x200000. In the present example, each sub-page includes the offsets 0x0000 to 0x1000. Examples of storing code and/or data include storing a file or a portion of a file.

In the present example, as illustrated with respect to sub-page 202, each sub-page of the memory page 200 includes a page entry 206. The page entry 206 may include features similar to the page entries described in FIG. 1. For example, the page entry 206 may include parameters specifying an address space, index into the address space, flags, physical address and so forth. In another example, page entries corresponding to the sub-pages are stored in a page array, rather than in the sub-pages themselves. For example, the page entries corresponding to the sub-pages are stored in the same page array that stores the page entries corresponding to the pages. In another example, the page entries corresponding to the sub-pages are stored in a different page array than the page array stores the page entries corresponding to the pages Storing a page entry 206 in the sub-page 202 may provide the advantage of memory savings. For example, if a page entry is 64 bytes, a page array that stores a plurality of page entries may utilize a large amount of memory if page entries for sub-pages are also included in the page array. Accordingly, each page entry for a sub-page may be stored in the sub-page itself, to reduce the memory overhead of a page array data structure. In this example, a page array may be utilized to store page entries for each memory page (e.g., memory page 200), with the page entries for the sub-page being stored in each sub-page of the memory page, as is illustrated with respect to sub-page 202. For example, a sub-page may be 4096 bytes and a page entry for the sub-page may be 64 bytes. In this example, the page entry may be stored in the first 64 bytes of the sub-page with the remaining 4032 bytes of the sub-page used to store other code and/or data.

The present example describes particular memory sizes corresponding to pages, sub-pages, and page entries. These memory sizes are provided as examples to illustrate the concept of providing a page-entry within a sub-page. In other examples, pages, sub-pages and page entries may be defined to have other memory sizes.

Figure 3A:
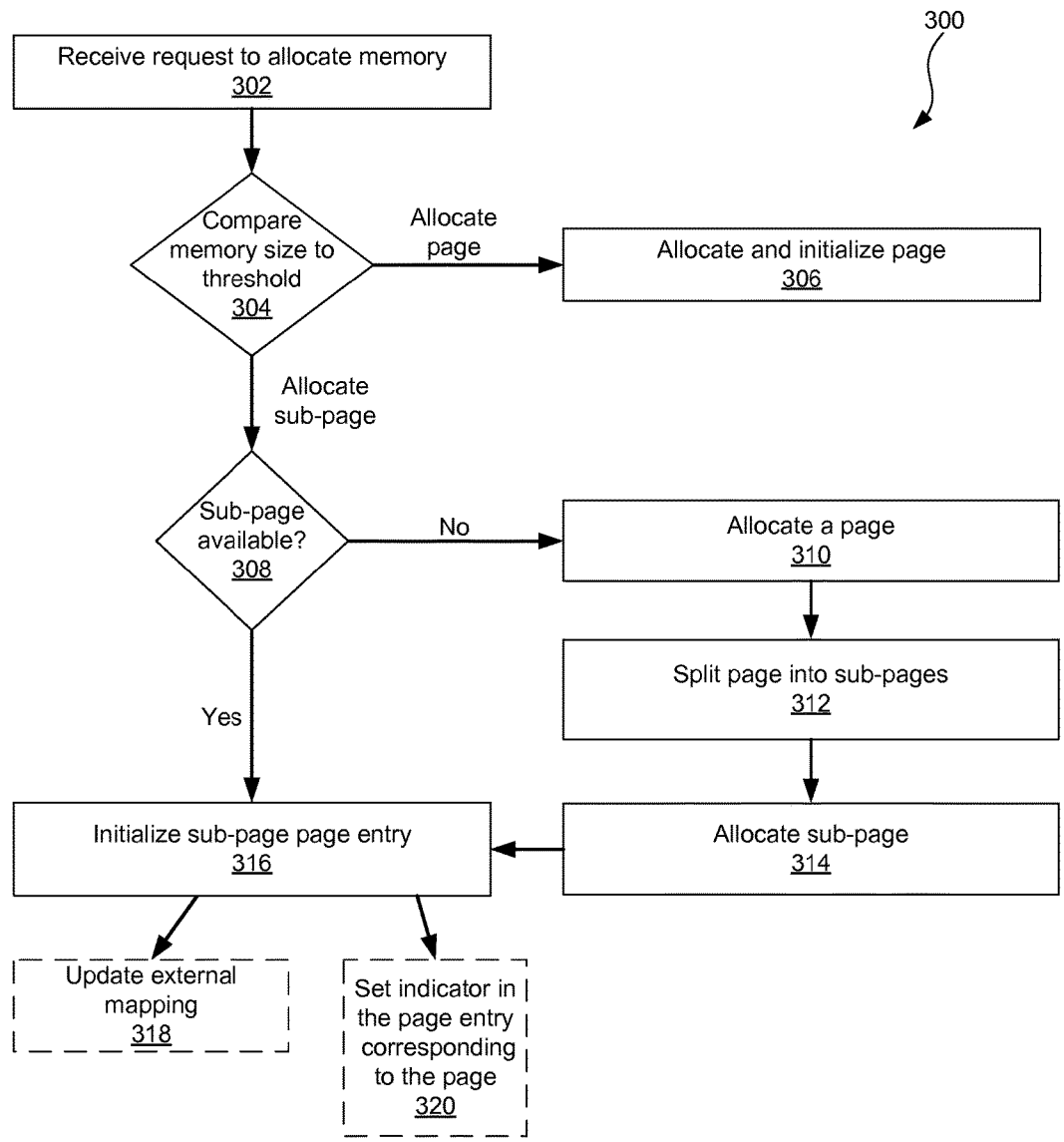
FIG. 3A is a flow diagram showing an illustrative a method for allocating of one or more memory pages, in accordance with various examples of the present disclosure.

Turning now to FIG. 3A, a flow diagram of a method 300 for allocating memory pages is illustrated according to aspects of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 302, the kernel receives a request to allocate memory. For example, a process or the kernel itself may request memory. In some examples, the request is for the kernel to allocate memory for caching a file or other data. In other examples, the request is for the kernel to allocate memory to load a file into the memory for execution. In yet another example, the request is for the kernel to allocate additional memory for an already existing process.

At action 304, responsive to the request, the kernel determines whether to allocate a page or a sub-page based on the size of the memory that is requested to be allocated. The determination whether to allocate a sub-page may be performed based on the kernel identifying whether allocating a sub-page would be more cost effective than allocating a page. In the present example, the determination includes comparing the size of the memory requested to a threshold.

In the present example, the kernel identifies the amount of memory requested. The kernel then compares the size of the memory requested with a size threshold to determine whether the memory requested exceeds, is below, or equal to the threshold. In some examples, if the amount of memory requested is less than or equal to the threshold, the kernel determines that a sub-page should be allocated. In other examples, if the amount of memory requested is less than the threshold, the kernel determines that a sub-page should be allocated. In yet another example, if the amount of memory is greater than the threshold, the kernel determines that a page should be allocated (rather than a sub-page). In yet another example, if the amount of memory is greater than or equal to the threshold, the kernel determines that a page should be allocated (rather than a sub-page).

For example, a page may have a size of 2 MB and a sub-page may have a size of 4 KB. If 1 KB of memory is requested, the kernel may compare the requested memory size (1 KB) with the sub-page size (4 KB) to calculate that the requested memory size would fit within a sub-page. Accordingly, based upon the calculation, the kernel may determine that splitting a memory page into sub-pages and allocating a sub-page is more cost effective than allocating an entire memory page.

In other examples, the size threshold may be pre-configured or user-defined. For example, a pre-configured size threshold may be set to the size of a sub-page. Based on this threshold, if the amount of memory requested is less than the size of the sub-page, kernel determines to split the page into sub-pages and allocate a sub-page. Otherwise, if the amount of memory requested is larger than a sub-page, the kernel determines to allocate a page, rather than split the page into sub-pages.

In another example, the size threshold may be a number of sub-pages. For example, the kernel may calculate whether more than a threshold number of sub-pages would be allocated to fit the size of the memory requested. Alternatively, the kernel may calculate whether less than a threshold number of sub-pages would be allocated to fit the size of the memory requested. In response to either of the above calculations, the kernel may determine whether to split the page.

At action 306, based upon the comparison, the kernel determines that the page should be allocated (rather than a sub-page). Thus, a page is allocated and initialized. A pre-existing memory page may be located and used, if available. If a pre-existing page is not available, allocation of the page may include locating and assigning free blocks of physical memory to the page. In some examples, allocating a page includes updating or adding a page entry in a page array and indexing the page entry within the page array. In some examples the page is initialized by configuring parameters in the page entry corresponding to the page, such as the count, address space, index into address space, flags, physical address, and so forth. If the request is to allocate memory that is larger than the page, additional memory pages may also be allocated and initialized.

In action 308, based upon the comparison, the kernel determines that a sub-page should be allocated. First, the kernel may determine whether a pre-existing sub-page is available. The kernel may, for example, identify whether there are memory pages that have been split into sub-pages that are available for use. A sub-page may be available for use if it was previously split from a page and not yet assigned. In another example, a sub-page may be available if it was previously used and then freed. The identification of available sub-pages may be performed by traversing a page array or other data structure.

At action 310, if there are no sub-pages available, a page may be allocated by locating a pre-existing memory page that is unused, or by allocating a new memory page. A new memory page may be allocated by, for example, locating and assigning free blocks of memory to the page and updating a page array with an entry for the page. If the request is to allocate memory that is larger than the page, additional memory pages may also be allocated and initialized.

At action 312, the kernel splits the allocated page into sub-pages. In some examples, based on the amount of memory requested, the page may be split into a number of sub-pages that accommodates the memory requested. For example, if each sub-page is 4 KB, and the amount of memory requested is 10 KB, then a 12 KB portion of the page may be split into three sub-pages, with the remaining portion of the page not being split into additional pages. In another example, the page may be split into sub-pages that are not yet requested, such that sub-pages are available to handle additional sub-page requests.

For example, the kernel may determine a number of sub-pages within the memory page. In some examples, the kernel may read a pre-configured value from memory that identifies the number of sub-pages within the memory page. For example, a page may be set to a size of 2 MB and a sub-page may be set to a size of 4 KB. Based on the page and sub-page sizes, a value may be set in memory that identifies that each page includes 512 sub-pages. Accordingly, the page may be split into 512 sub-pages.

In other examples, the kernel dynamically calculates the number of sub-pages by dividing the size of the page by the size of a sub-page. For example, a sub-page may have a dynamically configured page size that is configured with a size that fits the amount of memory requested. For example, the memory request may be a request for 1 KB of memory. Based on this request a sub-page size may be dynamically configured to be 1 KB. The kernel may divide a page into sub-pages having the determined sub-page size. In this example, with the sub-page size of 1 KB, the kernel may calculate that a 2 MB page may be split into 2000 sub-pages. Accordingly, the page may be split into 2000 sub-pages.

At action 314, a sub-page is allocated from the one or more sub-pages split from the page in action 312. The allocation may be performed by locating and assigning free blocks of memory to the sub-page. In some examples, a page array may be updated with a page entry corresponding to the sub-page. The page array may store page entries for both pages and sub-pages. In other examples, a page array is updated that corresponds to sub-pages, where the page array corresponding to the sub-pages is separate from another page array that corresponds to pages. In yet another example, a page entry is stored within the sub-page itself rather than being stored in a page array. In some examples, a page array corresponding to page entries of sub-pages is stored in kernel virtual memory such as vmalloc. If the requested memory is larger than the sub-page, additional memory sub-pages may also be allocated from one or more memory pages.

In the present example, each sub-page of the page is allocated on an as-requested basis. For example, a page may be split into a first sub-page in step 312. If another sub-page is requested, a second sub-page is split in step 312, and allocated from the memory of the page that follows the first sub-page. Accordingly, the kernel may track the available memory in each page and sub-pages allocated from each page, such that additional sub-pages may be split and allocated from memory pages on an as-requested basis.

At action 316, the sub-page is initialized. In some examples, the sub-page is initialized by setting the parameters in the page entry corresponding to the sub-page, such as the count, address space, index into address space, flags, physical address, and so forth. If the requested memory is larger than the sub-page, additional memory sub-pages may also be initialized. In the present example, the sub-page entry corresponding to the sub-page is initialized in a same page array that is used to store page entries of pages. In another example, the sub-page entry is stored in a separate page array than a page array that stores page entries. In yet another example, the sub-page entry is stored within the memory page that includes the sub-page, such as within the sub-page itself as is illustrated in FIG. 2.

Action 318 and/or 320 may also be performed in some examples.

Figure 3B:
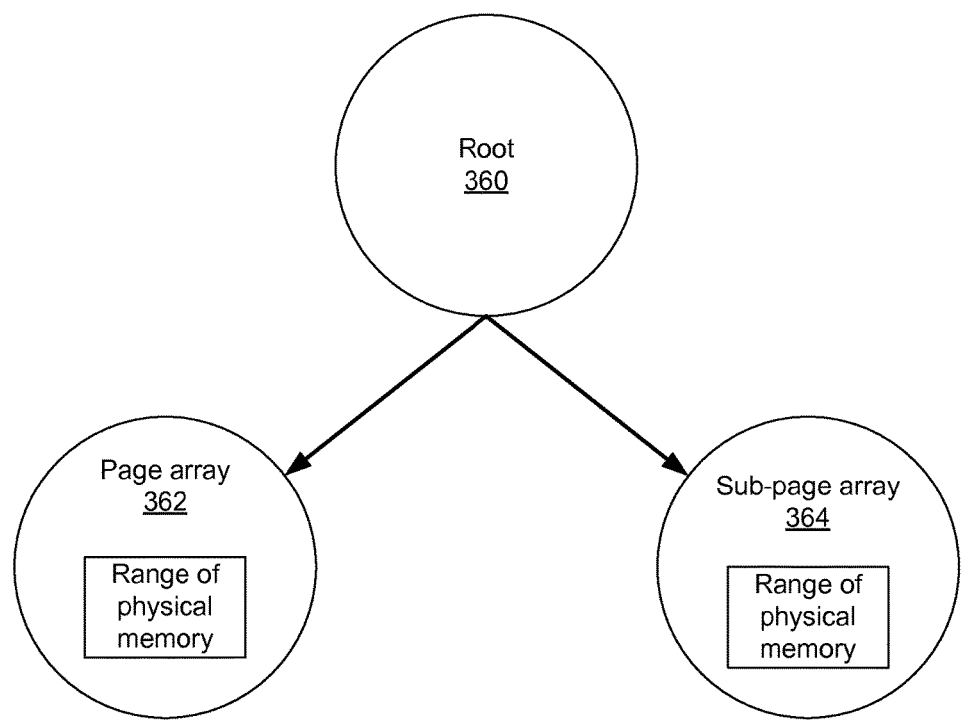
FIG. 3B is an organizational diagram illustrating an external mapping that associates ranges of physical memory to page management structures, in accordance with various examples of the present disclosure.

At action 318, an external mapping corresponding to the sub-page entry is updated to identify the range of memory corresponding to the sub-page entry. In some examples, the external mapping is a lookup structure such as a table (e.g., a hash table) or tree that associates page management data structures (such as page arrays and sub-page arrays) with ranges of physical memory. FIG. 3B illustrates an example tree for associating pages in page arrays and sub-page arrays with ranges of physical memory. The external mapping may be referred to, in some examples, to determine a page frame number corresponding to a page entry. Accessing an external mapping to determine a page frame number is described in more detail with respect to FIG. 4.

At action 320, a parameter is set in a page entry corresponding to the page that includes the sub-page. In some examples, each page entry includes a flag parameter that specifies whether the page includes sub-pages. Accordingly, in step 320, when a page has been split to include sub-pages, the flag is set in the page entry corresponding to the page to indicate that the page includes one or more sub-pages. In addition, sub-pages may also include a flag in their corresponding sub-page entries to indicate that they are sub-pages rather than pages.

The kernel may also determine the presence of the sub-page(s) based upon the particular page array that includes the page entry corresponding to the sub-page, an external mapping, and/or an alignment indicator. Identifying a sub-page for the purpose of calculating a page frame number is described in more detail with respect to FIG. 4.

FIG. 3B is an organizational diagram illustrating an external mapping that associates ranges of physical memory with page management structures, in accordance with various examples of the present disclosure.

In the present example, the external mapping is a non-binary tree. In other examples, a binary tree or other data structure may be used to associate ranges of physical memory to page management structures, such as page arrays. Further, while the tree in the present example illustrates a page array node 362 and a sub-page array node 364, in other examples there are additional page arrays and sub-page arrays included within the tree.

In the present example, the external mapping includes a root node 360 that is assigned an address in memory. The address of the root node 360 is stored in memory, such that a kernel may access and traverse the tree to retrieve physical address data corresponding to the page and sub-page arrays.

A page array node 362 corresponds to a page array that stores page entries for pages. A sub-page array node 364 corresponds to a sub-page array that stores page entries for sub-pages. Additionally, the page array node 362 and sub-page array node 364 may include child nodes that represent additional page array or sub-page array data structures.

In the present example, each page array node (e.g., page array node 362) and sub-page nodes (e.g., sub-page array node 364) is associated with a range of physical memory. As illustrated, both the page array node 362 and the sub-page array node 364 include a parameter that identifies a range of physical memory that is associated with the node.

For example, the page array node 362 has a range of physical memory parameter that specifies a start address corresponding to the first page included in the page array and an end address that specifies the end of the last page that is included in the page array. Similarly, the sub-page array node 364 has a range of physical memory parameter that specifies a start address corresponding to the first sub-page included in the sub-page array and an end address that specifies the end of the last sub-page that is included in the page array.

In the present example, the external mapping is updated as pages and sub-pages are allocated, and may be referred to by the kernel during page access operations.

Figure 4:
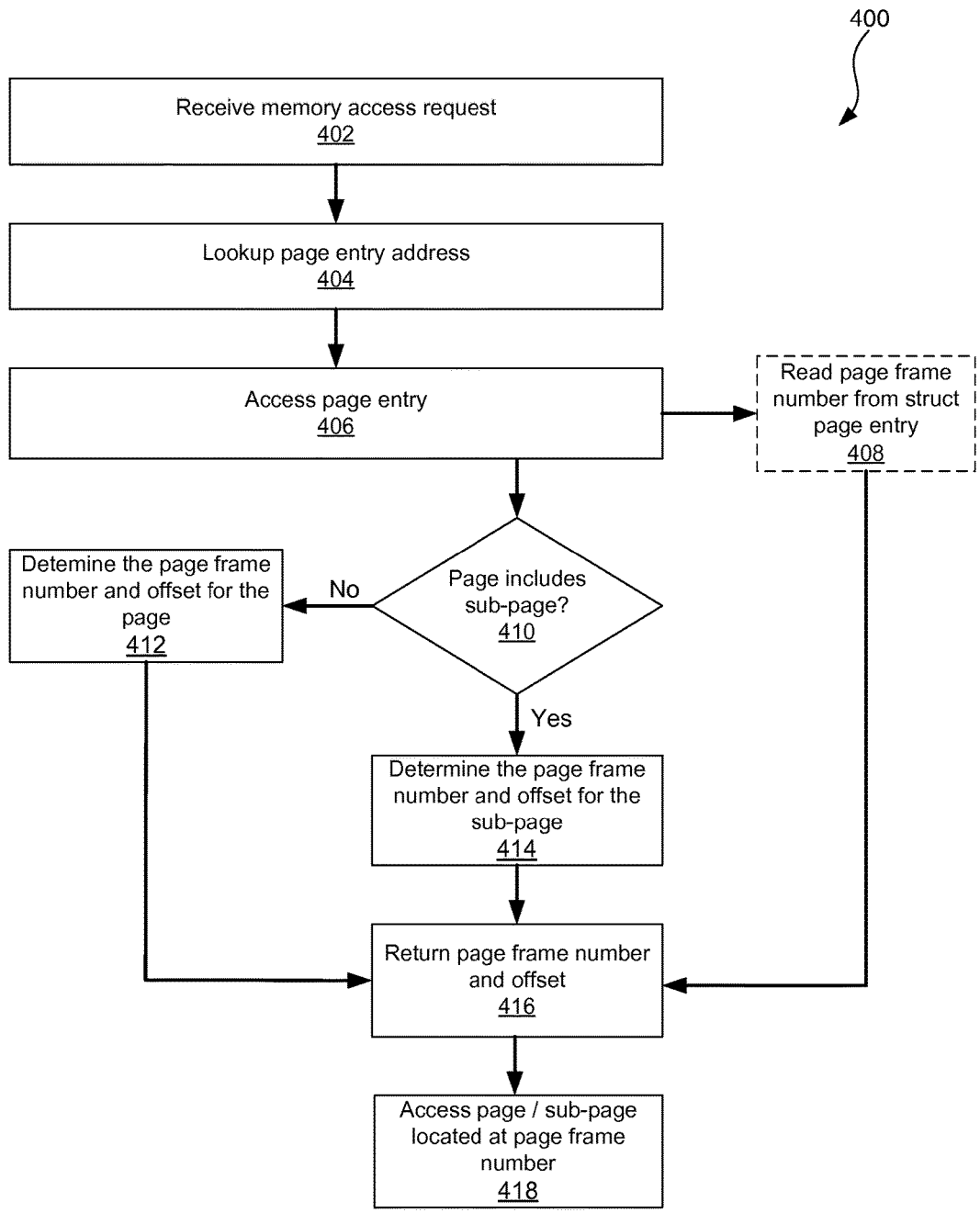
FIG. 4 is a flow diagram illustrating a method for determining a page frame number, in accordance with various examples of the present disclosure.
Figure 6:
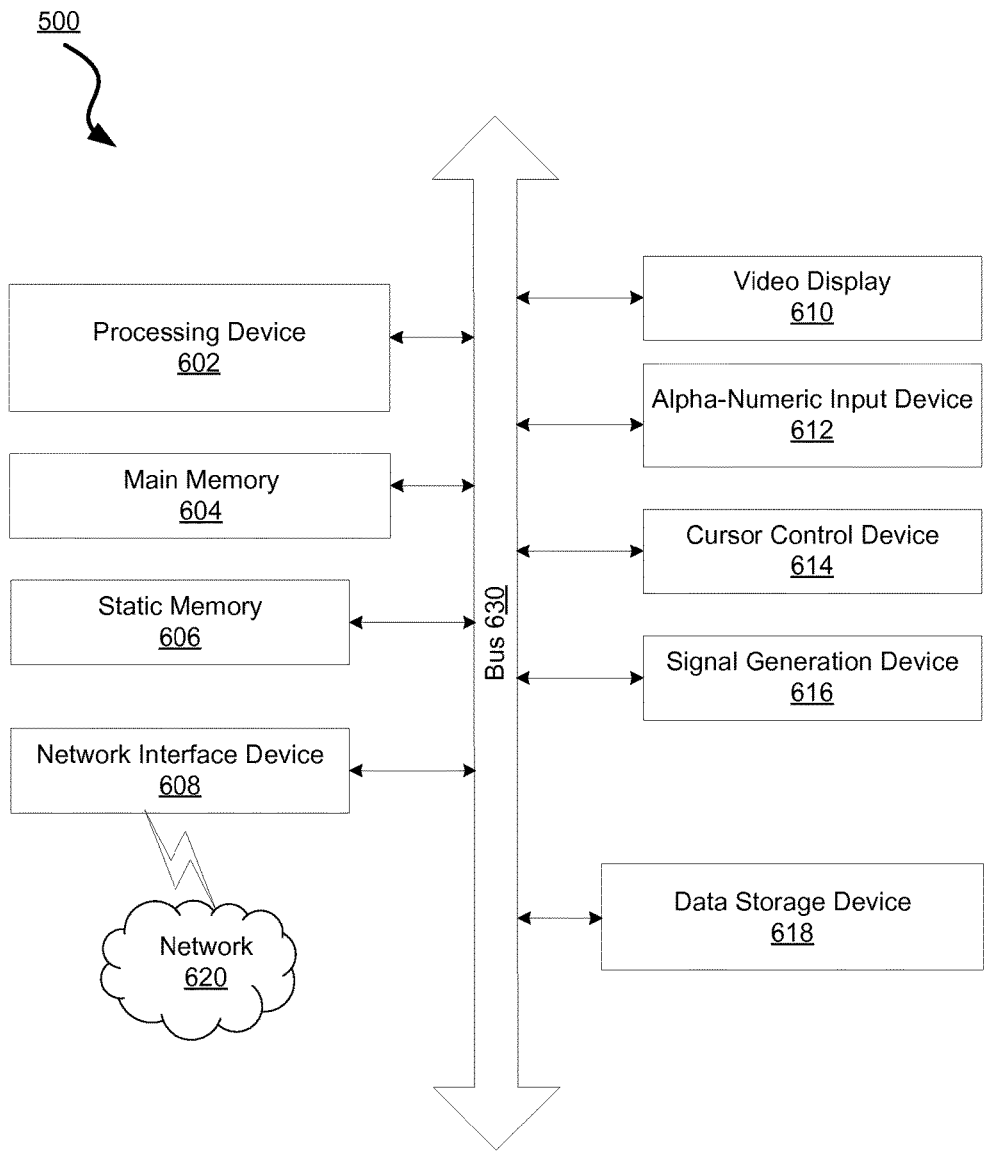
FIG. 6 is an organizational diagram illustrating a computer system that may perform one or more of the operations described herein, in accordance with various examples of the present disclosure.

Turning now to FIG. 4, a flow diagram of a method 400 for determining a page frame number is illustrated according to aspects of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 402, the kernel receives a request to access memory, such as by reading from a memory location or writing to a memory location. In the present example, the request is initiated by the kernel itself or a process executed by the kernel. In the present example, the memory location specified in the request is a virtual address of the memory.

At action 404, the address of the page entry corresponding to the request is identifying. In some examples, the page entry is stored in a page array. The page array may be indexed by virtual addresses, such that an input of a virtual address will identify a page entry in the page array. In some examples, the upper bits of the virtual address are used to identify the page entry. For example, in a 32-bit system, the upper seven bits of the virtual memory address may be used to locate page entries in the page array. In other examples, the location of the page entry may be looked up via a data structure such as a table (e.g., a hash table), tree, linked list, or other data structure.

At action 406, the page entry is accessed to read data from the page entry. For example, the page entry may be fetched such that parameters may be read from the page entry.

At action 408, a page frame number is read from the page entry. The page frame number may be stored in a parameter, such as a physical address parameter that is stored in the page entry. In other examples, a page entry does not store the page frame number, and the page frame number is determined based on the actions performed in blocks 410, 412 and 414.

At action 410, the kernel determines whether the page corresponding to the page entry includes a sub-page.

In some examples, the kernel reads a flag (e.g., pg_split) from the page entry to identify whether the flag is set, thus indicating that the page corresponding to the page entry is a split page or contains split pages.

In another example, the address of the page array that stores the page entry is itself an indicator regarding whether the page entry corresponds to a sub-page. For example, a first page array may be configured to store page entries of pages. A second page array may be configured to store page entries of sub-pages. Accordingly, based upon the page array that stores the page entry, the kernel may identify whether the page entry corresponds to a page or a sub-page.

In another example, an external mapping such as a lookup structure may be accessed to determine whether the page entry corresponds to a page or a sub-page. The lookup structure may be, for example, a tree, table (e.g., a hash table), or other data structure that includes for each page entry an indicator whether the page entry corresponds to a page or a sub-page.

In another example, an alignment indicator is parsed from the address of the page entry to identify whether the page entry corresponds to a page or a sub-page. An example of an alignment indicator is discussed in more detail in FIG. 5.

At action 412, the page entry is determined to correspond to a page, rather than a sub-page. The kernel is configured to identify which bits of the virtual address are the page frame number for a page, and which bits of the virtual address are the page frame number for a sub-page. Accordingly, by determining that the page entry corresponds to a page, the kernel is able to determine the page frame number by reading the bits of the virtual address that are the page frame number for a page. As illustrated in FIG. 5B, the bits of the virtual address corresponding to the page may be the four page frame number 510 bits to the left of the twenty-one bits of the page offset 508. Identifying the four page frame number 510 bits may be performed by, for example, shifting the virtual address to the right by twenty-one bits.

In some examples, the page frame number is calculated by subtracting the start address of the page array from the address of the page entry. The resulting address is an offset into the page array. This offset may then be divided by the size of the page entry to determine the page frame number. In some examples, the determining of the page frame number and offset from the virtual memory address is referred to as translating the virtual memory address.

At action 414, the page entry is determined to correspond to a sub-page, rather than a page, and therefore the page frame number is determined for the sub-page.

For a sub-page, the page frame number may be the page frame number of sub-page 504 bits that are to the left of the page offset 502. Accordingly, by identifying that the page frame number is for a sub-page, the kernel may use the thirteen bits to the left of the twelve bits of the page offset 502. Identifying the thirteen page frame number 504 bits may be performed by, for example, shifting the virtual address to the right by twelve bits.

In another example, the kernel may determine the page number corresponding to the page that includes the sub-page, such as by the mechanism described at action 412. Next, the index of the sub-page into the page may calculated. This may be performed by, for example, subtracting the start address of the page array from the address of the sub-page entry. The resulting address is an offset into the page array. This offset may then be divided by the size of the sub-page entry to determine the index into the page. Next, the bits of the index into the page are combined with the bits page frame number of the page. For example, if the page frame number of the page is 0010 and the bits of the index into the page are 0 0000 0001, the bits may be combined by inserting the page frame number of the page to the left of the bits of the index. The resulting address in this example would be 0010 0 0000 0001. This address is the page frame number of the sub-page.

In another example, if the page entry is stored in kernel virtual memory, such as vmalloc, the address of the page entry may be used to determine the page frame number of the page described by the page entry. For example, the start address of the page array may be subtracted from the address of the page entry to obtain an offset into the page array, which is divided by a page entry of a page or sub-page to determine a page frame number as described in actions 412 and 414. In another example, the page entry of the page or sub-page in the kernel virtual memory includes a stored parameter that specifies the page frame number corresponding to the page or sub-page. In this example, the page frame number is retrieved from the parameter. The parameter may be, for example, a physical address stored in the page entry that specifies the page frame number.

In another example, a lookup structure, such as a table (e.g., a hash table), linked list or tree, is used to determine the page frame number. For example, each page entry may correspond with an entry in the lookup structure. The lookup structure may be accessed to retrieve the page frame number of the page that includes the sub-page. The index into the page corresponding to the sub-page may be calculated as described above. The page frame number of the page may then be combined with the calculated index, in order to determine the page frame number of the sub-page. For example, if the page frame number of the page is four bits, the four bits of the page frame number of the page may be inserted to the left of the calculated index in order to determine the page frame number for the sub-page.

In another example, the page entry is in a section such as a hotplug or disontiguous memory section. In this example, the address of the section that includes the page array that includes the page entry is be retrieved. The start address of the page array may be subtracted from the address of the page entry to obtain an offset into the page array, which is divided by a page entry of a page or sub-page to determine a page frame number as described in actions 412 and 414. In another example, the page entry of the page or sub-page in the section includes a stored parameter that specifies the page frame number corresponding to the page or sub-page. In this example, the page frame number is retrieved from the parameter. The parameter may be, for example, a physical address stored in the page entry that specifies the page frame number.

In some examples, the determining of the page frame number and offset from the virtual memory address is referred to as translating the virtual memory address.

At action 416, in the present example, the page frame number and offset are returned to the kernel. In other examples, the page frame number and offset may be returned to a particular process or program that requested access to the page or sub-page.

At action 418, in the present example, the kernel uses the page frame number to access the page or sub-page that is located at the address in physical memory that is specified by the page frame number. In some examples, the page frame number and offset are passed to another module or program to perform the access. In some examples, accessing an offset of a page or sub-page includes reading data from the offset within the page or sub-page, writing data to the offset within the page or sub-page, and/or executing an instruction located at the offset within the page or sub-page. For example, if the request to access the memory is a read request, the kernel may read the offset at the determined page frame number. If the request to access the memory is a write request, the kernel may write to the offset at the determined page frame number. If the request to access the memory is an execute request, the kernel may read an instruction from the offset at the determined page frame number, and execute the read instruction. In some examples, a read, write or execute request may specify a range of offsets of the page/sub-page. Accordingly, while the above disclosure refers to reading and writing data to an offset, and executing an instruction at an offset, similar principles may be applied to perform read, write and execute operations to a range of offsets of the page/sub-page, and also to a range of offsets located in a plurality of pages/sub-pages.

FIG. 5A is an organizational diagram illustrating a layout of a virtual memory address, in accordance with various examples of the present disclosure.

In the present example, the virtual memory address is split into a page frame number 502 and a page offset 504. The page frame number 502 includes a pre-determined amount of bits of the virtual memory address having a higher significance than a pre-determined amount of bits of the virtual memory address corresponding to the page offset 504. In the present example, the page frame number 502 identifies a physical memory address corresponding to a page or sub-page of memory and the page offset identifies a location within that page or sub-page. The descriptions for this figure refer to pages, but are equally applicable to sub-pages. Each page/sub-page in memory has a page frame number that identifies the physical address of the page/sub-page in the memory and offsets that identify locations within the page/sub-page. A page offset 504 may also be referred to as a memory offset or an offset.

The page offset 504 identifies an offset within the page identified by the page frame number 502. Each page has a page size, which is the amount of memory occupied by the page. The page has a start offset, at the beginning of the page, which in the present example is zero. The page also has an end offset, which is an offset corresponding to the end of the page. The end offset may depend upon the page size. For example, if the page is a 4 KB page, the end offset of the page may be 0x1000, as illustrated in FIG. 2. For example, if the page is a 2M page, the end offset of the page may be 0x200000, as is illustrated in FIG. 2. The page offsets from the start offset to the end offset may be used to store code and/or data in the memory page.

In some examples, the virtual address further includes additional portions, such as a portion that identifies the location of a page entry, which corresponds to the page, in a page management data structure. For example, the page entry may be located in a page array as is illustrated in FIG. 1.

In some examples, the virtual address is 32 bits. In other examples, the virtual address is 64 bits. In yet other examples, the virtual address includes fewer or additional bits. While the examples in FIG. 5B and FIG. 5C, below, illustrate virtual memory addresses having 32 bits, in other examples the virtual addresses may have different numbers of bits (e.g., 64 bits). In a virtual memory address having an amount of bits other than 32, the layout of the virtual address may include a different amount of bits corresponding to the page frame number, page offset, and alignment indicator portions.

FIG. 5B is an organizational diagram illustrating a layout of a virtual memory address of a sub-page, in accordance with various examples of the present disclosure.

As shown in the present example, the address (0x201000) is a 32-bit address that includes an upper thirteen bits that identify the page frame number 506 of a sub-page and a lower 12 bits that identify a page offset 508. The page offset 508 is a page address that may be used to store code and/or data of the sub-page. The alignment indicator 510 indicates that the virtual address corresponds to a sub-page because the bits in the alignment indicator include at least one bit that is non-zero.

In some examples, the alignment indicator 510 portion of the address may be parsed by the kernel to determine whether any of the plurality of alignment indicator bits are non-zero, thus indicating that the address corresponds to a sub-page rather than a page. Parsing the alignment indicator 510 may include, for example, shifting the bits of the virtual address and comparing the shifted bits of the virtual address to zero.

In some examples, the bits to the left of the page frame number (e.g. the seven bits on the left) are bits that may be used to identify a page entry in a page management data structure.

FIG. 5C is an organizational diagram illustrating a layout of a virtual memory address of a page, in accordance with various examples of the present disclosure.

As shown in the present example, the address (0x1400000) is a 32-bit address that includes an upper four bits that identify the page frame number 512 of the page and a lower 21 bits that identify page offset 514. The page offset 514 is a page address that may be used to store code and/or data of the page. The alignment indicator 516 indicates that the address may correspond to a page rather than a sub-page because the bits in the alignment indicator are all zero.

In some examples, the alignment indicator 516 portion of the address may be parsed to by the kernel determine whether any of the bits are non-zero. Parsing the alignment indicator 516 may include, for example, shifting the bits of the virtual address and comparing the shifted bits of the virtual address to zero. If the bits are all zero, the kernel may confirm that the address corresponds to a page rather than a sub-page. The kernel may, for example, parse a flag or other indicator from a page entry, or access an external mapping structure to confirm that the address corresponds to a page.

In some examples, the bits to the left of the page frame number (e.g. the seven bits on the left) may be used to identify a page entry in a page management data structure.

In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 600 includes processing device (processor) 602, main memory 604 (e.g., read-only memory (ROM), flash memory, dynamic random access memory (DRAM) such as synchronous DRAM (SDRAM), double data rate (DDR SDRAM), or DRAM (RDRAM), and so forth), static memory 606 (e.g., flash memory, static random access memory (SRAM), and so forth), and data storage device 618, which communicate with each other via bus 630.

Processor 602 represents one or more general-purpose processing devices such as a microprocessor, central processing unit, or the like.

More particularly, processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute instructions for performing the operations and steps discussed herein.

Computer system 600 may further include network interface device 608.

Computer system 600 also may include video display unit 610 (e.g., a liquid crystal display (LCD) or a cathode ray tube (CRT)), alphanumeric input device 612 (e.g., a keyboard), cursor control device 614 (e.g., a mouse), and signal generation device 616 (e.g., a speaker).

Data storage device 618 may include a computer-readable storage medium on which is stored one or more sets of instructions (e.g., software) embodying any one or more of the methodologies or functions described herein. The instructions may also reside, completely or at least partially, within main memory 604 and/or within processor 602 during execution thereof by computer system 600, main memory 604 and processor 602 also constituting computer-readable storage media. The instructions may further be transmitted or received over network 620 via network interface device 608.

While data storage device 618 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for accessing memory of a computer, the method comprising:
   receiving a memory allocation request;
   comparing a memory size corresponding to the memory allocation request to a memory size threshold;
   allocating a memory page that has a size larger than the memory size threshold, the memory page having a page entry in a page management data structure;
   allocating a portion of the memory page, the portion of the memory page corresponding to a sub-page of the memory page;
   setting a parameter in the page entry, the parameter indicating that the memory page includes one or more sub-pages; and
   creating a sub-page entry corresponding to the sub-page within the allocated portion of the memory page.

2. The method of claim 1, wherein the sub-page entry comprises the following parameters: an address space corresponding to the sub-page; an index into the address space; and one or more flags corresponding to the sub-page.

3. The method of claim 1, wherein the memory page has a size of two megabytes and the sub-page has a size of four kilobytes.

4. The method of claim 1, wherein the page entry has a struct data type.

5. The method of claim 1, wherein the page entry includes a parameter that identifies a page frame number corresponding to the memory page.

6. The method of claim 1, wherein the page management data structure is a page array.

7. The method of claim 1, wherein a virtual address of the memory page includes an alignment indicator, the alignment indicator including a plurality of bits that are all set to zero.

8. The method of claim 1, wherein a virtual address of the sub-page includes an alignment indicator that includes one or more bits that are set to one.

9. The method of claim 1, wherein the sub-page entry includes a parameter that identifies a page frame number corresponding to the sub-page.

10. The method of claim 1, further comprising:
updating a lookup structure, wherein the lookup structure identifies a range of physical memory corresponding to the page management data structure.

11. A computer program product stored on a non-transitory computer-readable medium, the computer program product comprising machine readable instructions that when executed by a processor cause the processor to:
determine that a memory size corresponding to the memory allocation request is below a memory size threshold;
allocate a memory page, the memory page having a page entry in a page array;
allocate a sub-page of the memory page, the sub-page included within a range of physical memory allocated to the memory page; and
set a parameter in the page entry to indicate that the memory page includes one or more sub-pages; and
create a sub page entry corresponding to the sub-page within the range of physical memory allocated to the memory page.

12. The medium of claim 11, the processor further to: create the sub-page entry at a start offset of the sub-page, wherein the sub-page entry includes at least the following parameters: an address space corresponding to the sub-page; an index into the address space; and one or more flags corresponding to the sub-page.

13. The medium of claim 12, wherein the page entry includes a page frame number corresponding to the memory page, and wherein the sub-page entry includes a page frame number corresponding to the sub-page.

14. The medium of claim 11, wherein the memory page has a size of two megabytes and the sub-page has a size of four kilobytes.

15. The medium of claim 11, wherein a virtual address of the memory page includes a plurality of alignment bits that are all set to zero, wherein a virtual address of the sub-page includes at least one alignment bit that is set to one.

16. A system for managing memory pages, the system comprising:
a processor and a memory, the memory including a sub-page that is stored within a memory page;
the memory including a page array that includes a page entry corresponding to a memory page;
the page entry including a parameter that indicates that the memory page is split into one or more sub-pages;
the processor to create a sub-page entry in a sub-page of the one or more sub-pages, the sub-page entry including at least the following parameters: an address space corresponding to the sub-page; an index into the address space; and one or more flags corresponding to the sub-page.

17. The system of claim 16, wherein the page entry identifies a page frame number of the memory page, and wherein the sub-page entry identifies a page frame number of the sub-page.

18. The system of claim 16, wherein the memory page has a size of two megabytes and the sub-page has a size of four kilobytes.

19. The system of claim 16, wherein a virtual address of the memory page includes a plurality of alignment bits that are all set to zero, wherein a virtual address of the sub-page includes at least one alignment bit that is set to one.

* * * * *